POSITION CONTROL SYSTEM FOR MAGNETIC MEMORY

Filed April 11, 1968 2 Sheets-Sheet 1

INVENTORS: R. V. GUNTHER
D. E. KISH
J. L. SMITH
BY: Charles Scott Phelan
ATTORNEY

United States Patent Office 3,544,981
Patented Dec. 1, 1970

3,544,981

POSITION CONTROL SYSTEM FOR MAGNETIC MEMORY

Ronald V. Gunther, Cranford, Donald E. Kish, North Plainfield, and James L. Smith, Bedminster, N.J., assignors to Bell Telephone Laboratories, Incorporated, Murray Hill, N.J., a corporation of New York Filed Apr. 11, 1968, Ser. No. 720,609
Int. Cl. G11b *5/48, 21/08, 21/10*
U.S. Cl. 340—174.1 13 Claims

ABSTRACT OF THE DISCLOSURE

A writing head for a planar magnetic memory is moved in the direction of a selected memory location in accordance with address signals provided to the memory. The same address signals also cause a read-level current to be applied to memory access circuits corresponding to the selected location. Sensing heads on the same carriage with the writing head detect the magnetic fields resulting from the access currents and the detection output is utilized to stop the head at the selected location. A differentiating-type of sensing head is employed for the positioning function, and a comb-type writing head is employed for establishing information writing conditions. Theshold logic circuits respond to the sensing head output for stopping the writing head at the selected location.

BACKGROUND OF THE INVENTION

Field of the invention

This invention relates to a magnetic memory and it relates in particular to an arrangement for accurately positioning a transducing head in such a memory.

Description of the prior art

It is known in the art to read and write in a magnetic memory by applying coincident currents to appropriately selected access circuits which are coupled to the magnetic storage elements in the various memory locations. It is also known to read and write in a magnetic memory by means of a movable writing head which is positioned in a desired location either in response to address signals or by manual means. Combinations of the two techniques are also known wherein a memoy is read by the coincident current technique on selected access circuits, and it is written by means of a movable writing head. This latter hybrid type of memory access is convenient for use in high packing density memories that are to be operated on an electronically alterable nondestructive readout basis because the high writing currents which are usually necessary to alter electrnoically the information in the memory can be utilized in a movable writing head without being troubled by the half-select disturbance problem which characterizes coincident current access arrangements.

One of the principal problems encountered in high packing density memory considerations is the problem of positioning the movable writing head with sufficient accuracy so that each time it is provided with the same address information it will always move to the same memory location corresponding to that information independently of effects such as electric circuits elment aging, environmental temperature, voltage regulation, and servo loop stability problems. For example, it is known to provide a command signal having a magnitude which is a function of the extent of writing head movement required to move to a selected memory location. As the head moves, the net command signal is reduced; and when the command signal has been completely nulled, the head should be at the addressed location. However, temperature and power supply regulation problems can cause a significant variation in the memory location to which the head is actually driven unless complex and expensive regulation equipment is employed. For example, in a planar nondestructive readout memory, a change in signal magnitude or in mechanical element dimension can easily produce a variation in the end location of the writing head of a few thousandths of an inch for a memory plane with lateral dimensions in the 20–30 inch range. Such positional variations can easily cause writing effects to be inadequate at the desired location and incorrect at nearby locations in a high packing density memory.

It is known in the magnetic disk and drum art to store a homing signal in the memory along with the desired data to help place the memory writing head in an optimum position with respect to the stored data once the head has been coarsely positioned by some other means. This homing technique has a number of difficulties. It requires extra storage space for the homing signals and thus reduces the effective packing density for useful data information. The prior art systems usually employ closed servo loops that require close attention to stability considerations. Furthermore, the coarse positioning systems, and sometimes the fine positioning systems, employ mechanical movements for positioning the writing head and do not provide a good way to account for the effects of backlash in the mechanical movements. The prior art homing systems which employ a coarse positioning arrangement are also subject to the same aforementioned difficulties, such as temperature and voltage regulation, with respect to their coarse systems in that they still may locate the head adjacent to the wrong address locations so that the stored homing signal from the incorrect location will control the fine positioning of the head.

It is therefore one object of the present invention to improve positioning systems for magnetic memories.

It is another object to reduce the sensitivity of head positioning systems for magnetic memories to factors such as environmental temperature, signal regulation, and servo loop stability.

SUMMARY OF THE INVENTION

The aforementioned and other objects of the invention are realized in an illustrative embodiment in which a transducing head for a magnetic memory is driven in the direction of a selected storage location in accordance with a first function of applied address signals. The head is stopped at the selected location in accordance with a second function of the memory address signals.

It is one feature of the invention that the transducing head driving arrangement is only direction-sensitive to the address signal input and is independent of variations in the address signals which do not alter the digital address defined thereby.

It is another feature that the transducing head movement is stopped in response to the detection of access current in memory access conductors associated wtih an addressed location, and the stopping operation is also independent of variations in that current.

A further featured aspect of the invention is that a threshold logic system is responsive to the detection of the access conduction current to compel the transducing head always to approach a selected location from the same predetermined direction before it is permitted to stop there in order to minimize backlish effects in mechanical movements.

DESCRIPTION OF THE DRAWING

A more complete understanding of the invention and its various features, objects, and advantages, may be obtained from a consideration of the following detailed description when taken in connection with the appended claims and the attached drawings in which:

DETAILED DESCRIPTION

Figure 1:
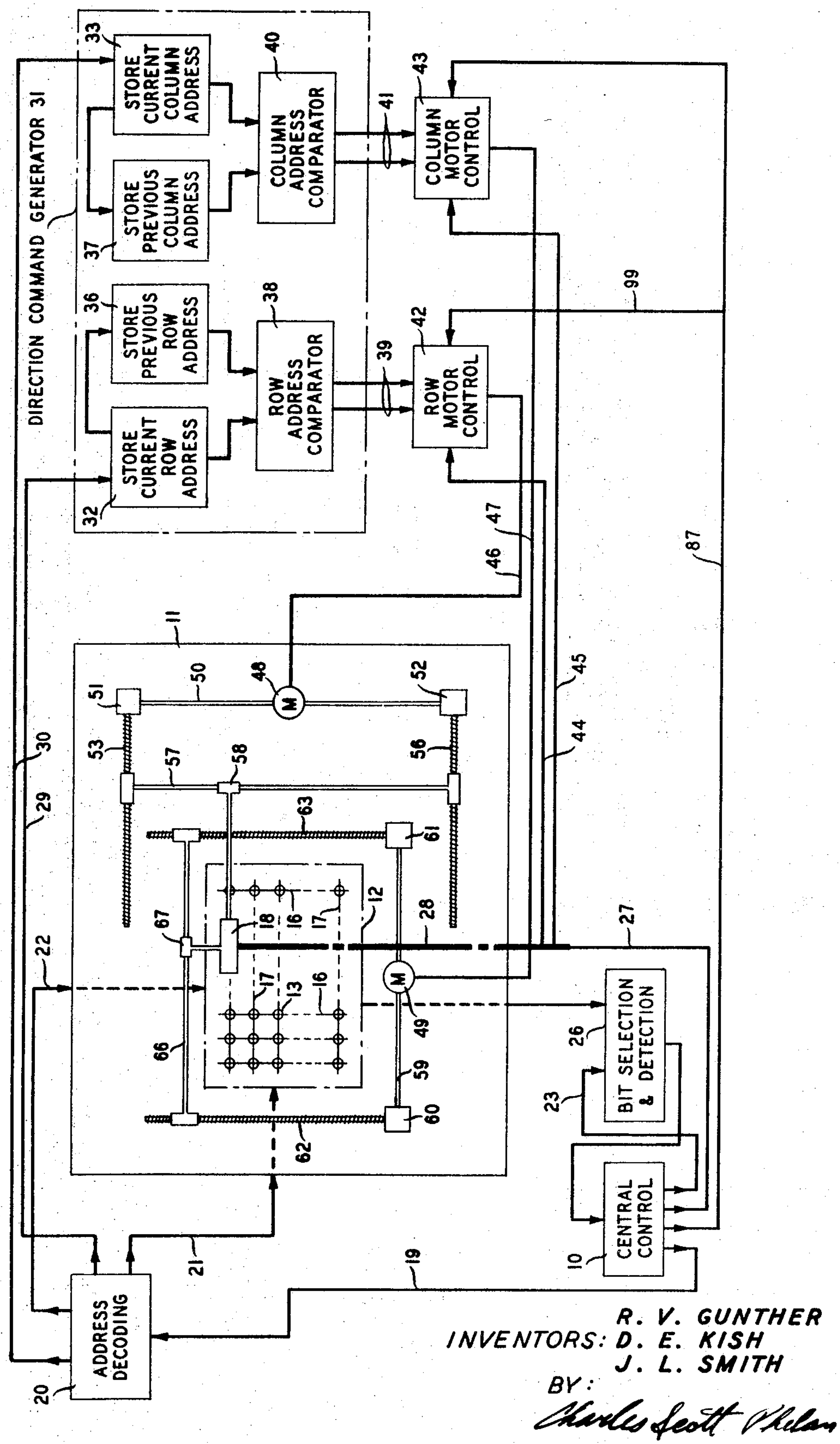
FIG. 1 is a block and line diagram of a data processing system employing a magnetic memory transducing head positioning arrangement in accordance with the invention.

In FIG. 1 a central control 10 for a data processing system controls a memory 11, which is operated in a manner to be hereinafter described, as a semipermanent memory for storing information which requires only infrequent change. The memory includes a planar array 12 of storage elements, such as 13, which are located at the intersections of a set of column conductors 16 and a set of row conductors 17, only two of which in each set are numbered, for supplying access current on a coincident current basis to selected ones of the memory storage locations at which elements 13 are positioned. Each of the storage elements 13, of which only sixteen are illustrated in FIG. 1, advantageously comprises a so-called bicore element which is a laminated magnetic thin film structure. For example, a first film spot of a magnetically soft Permalloy material is deposited on a suitable substrate at each storage location, an intermediate layer of copper or gold is deposited on the soft magnetic material, and then a film of hard magnetic material, such as cobalt, is deposited on top of that. Either isotropic or anisotropic material can be employed; and, if the latter is employed, the easy axes of the soft and hard materials are oriented in parallel to one another; and they are further oriented in parallel to the respective row access conductors 17. The magnetization of the soft permalloy is formed to be the opposite of the orientation of the magnetization in the hard material so that during readout operations the soft material is temporarily switched by read current fields and is then reset by hard material demagnetizing fields to conform to the dictates of the hard material magnetization upon the removal of the read current. The hard magnetic material magnetization is established by means of a field supplied through a writing head, to be described, in a carriage 18.

In the manufacture of the memory plane 12, one set of access conductors is advantageously deposited directly on the memory element plane and the other set is applied thereto in the form of an overlay. For the purpose of the present invention, the result to be achieved in manufacture is to have the access conductors fixedly associated with the respective memory elements 13 so that there is no significant change in their relative positional relationship with variations in environmental temperature. In a preferred form of the memory, each of the elements 13 is advantageously approximately 5 mils in diameter and the elements are arranged on 10 mil centers. There may be approximately six million elements 13 in the plane 12 to provide twenty 100-bit word locations along each of 3000 rows of storage locations.

Central control 10 supplies address signals in a cable 19 to an address decoding circuit 20 which causes read level current to be applied through cables 21 and 22 to selected row conductors 17 and column conductors 16 for writing and to a selected row conductor for reading. The manner of decoding address signals to supply access current pulses at desired timed to selected circuits is well known in the art. During a writing operation decoding circuit 20 supplies read-level current to a single row circuit 17 containing the desired word and to a single column circuit 16 approximately centrally located in the desired word. During a reading operation decoding circuit 20 supplies read level current to a single row circuit 17 containing the desired word, and central control 10 also provides signals through a cable 23 to bit selection and detection circuits 26 which are operated in a well known manner to be receptive during readout intervals to information signals appearing on those column circuits 16 which correspond to the 100 bit locations of a word selected by address information provided from central control 10.

During writing operations central control 10 supplies information signals for the 100 bits which are to be written through cables 27 and 28 to the writing head in carriage 18.

The position of carriage 18 during each writing interval is controlled by the address information in address decoding circuits 20. The latter information is supplied through cables 29 and 30 for the row and column address information, respectively, to a direction command generator 31. The generator 31 stores each set of row and column address information temporarily in a register 32 for row information and a register 33 for column information. Such address information is thereafter transferred to similar row and column address storage registers 36 and 37 so that it will be available in a subsequent writing interval for comparison with the then current address information. Thus, during each writing interval a row address comparator 38 compares the current and previous row address information to determine the relative magnitudes thereof and provide a double rail output signal on conductors 39 to indicate the polarity of the current row address with respect to the previous row address. The signal on conductors 39 represents a command for the directions of movement of the carriage 18 in the row direction toward the currently selected address. Similarly, a column address comparator 40 compares the current and previous column address information from the registers 33 and 37 to provide a column direction command signal on conductors 41. Registers and digital information comparators of the type indicated in direction command generator 31 are well known in the art and need not be described herein.

A row motor control circuit 42 and a column motor control circuit 43 receive the direction command signals from conductors 39 and 41, respectively, and operate in a fashion which will be described in connection with FIG. 3 to control the movement of carriage 18. As will be subsequently described, the outputs from motor control circuits 42 and 43 comprise trains of two-phase pulses on circuits 46 and 47, respectively, for controlling stepping motors 48 and 49 which are operated to drive the carriage 18 in the row direction and column direction, respectively. The drive continues in each of the row and column directions independently until sensing heads, to to be described, in the carriage 18 detect row and column circuits with access current present. At that time the sensing heads provide signals in circuits 44 and 45 of the cable 28 to the row and column motor control circuits 42 and 43 for stopping the motors 48 and 49.

Motors 48 and 49 and the associated apparatus for coupling them for moving carriage 18 are illustrated in simplified schematic form in FIG. 1, because details of such mechanical movements are well known in the art and comprise no part of the present invention. Thus, for example, a single motor is shown for each set of coordinates, but they include schematically systems that are well known for coarse and fine control of the carriage movement and also systems for high speed and low speed drive, all of which are readily implemented for control in response to currents in memory access circuits as herein described.

Motor 48 is provided with a drive shaft 50 extending from both sides of the motor to mechanical coupling structures 51 and 52 for driving threaded shafts 53 and 56 in rotation for positioning a support rod 57 in the row direction with respect to memory plane 12. A member 58 is freely movable on the rod 57 and is mechanically coupled to the carriage 18 for supporting that head for movement in the row direction. Many suitable mechanical arrangaments will be obvious to those skilled in the art for coupling the stepping motor 48 to drive the carriage 18 in the row direction while still leaving the head a degree of freedom of movement in the column direction for similar independent drive. In one embodiment threaded micrometer-type drives were employed for the coupling between the motor 48 and the carriage 18. In a similar fashion the motor 49 has a drive shaft 59 for operating mechanical couplings 60 and 61 to drive threaded shafts 62 and 63 for positioning a support rod 66 to drive the carriage 18 in the column direction of the memory plane 12. A member 67 provides support for carriage 18 while maintaining freedom of movement for the carriage in the row direction.

Although the carriage 18 is schematically shown in FIG. 1 as being cantilevered from the members 58 and 67, this is simply to facilitate illustration for drawing purposes. In a preferred mechanical arrangement carriage 18 is secured beneath member 67 and over the memory plane 12, and the member 58 is directly coupled to the member 67 so that the carriage 18 is freely movable in the row direction and in the column direction, either independently or simultaneously, as may be required by control signals from the motor control circuits 42 and 43.

During a writing operation carriage 18 is moved in either or both of the row and column directions as hereinbefore described, and read level pulse trains are provided to the selected row and column access conductors by the address decoding circuits 20. The pulse repetition rate of the latter pulse trains is much higher than the repetition rate of the motor drive pulse trains for motors 48 and 49 so that the motor essentially does not move between one access circuit pulse and the next. This allows the use of a position sensing head with only high-frequency pass characteristics and eliminates the erroneous sensing of stray magnetic fields such as those due to the memory elements. For example, read current pulses of about 10 kilohertz have been advantageously used in conjunction with motor drive pulses of about one kilohertz.

Figure 2A:
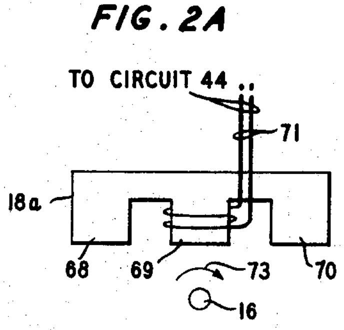
FIG. 2A illustrates a sensing head of the type employed in FIG. 1.

In FIG. 2A a sensing head of the type advantageously employed in movable carriage 18 is shown in greatly enlarged form adjacent to an access conductor 16. The head **18*a* is an E-shaped member with three legs 68, 69, and 70, and has a sensing winding 71 wound on the center leg 69 of the structure. Since the head 18*a* is shown in relation to a column access conductor 16, the winding 71 is coupled thrugh the circuit 44 for affecting the row motor control circuit 42. A similar head, not shown, is oriented in carriage 18 in a perpendicular manner with respect to head 18*a* to sense magnetic fields around row conductors for supplying signals through its circuit 71 and the circuit 45 to the column motor control circuits 43**. A preferred head of the type shown in FIG. 2A has leg portions of about 10-mil widths in the plane of the drawing with intervening slots of about 5 mils width.

Figure 2B:
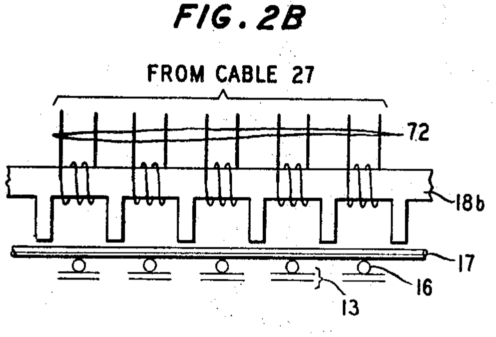
FIG. 2B illustrates a multibit writing head of the type employed in FIG. 1.

A multibit writing head **18*b* is shown in FIG. 2B and is of the comb type with multiple information coils 72 wound on the back portion of the comb between adjacent teeth. The coils 72 are connected through the cables 27 and 28 to the central control 10 for receiving in bit parallel fashion the information signals for accomplishing the writing operation. A few of the laminated memory storage elements 13 are shown adjacent to the teeth of the comb head 18*b*. Elements 13 lie between ends adjacent teeth to be controlled in response to signals in the coils 72 in a manner which is known in the art. Overlying the elements 13 are unnumbered column conductors between their respective elements 13 and a row conductor 17. A preferred comb size for the aforementioned 5-mil memory elements comprises a head with teeth 2 mils in width and spaced 8 mils apart. It is to be understood, however, that specific dimensions of either the writing head, the sensing head, or the memory elements will depend upon what specific type of memory element is employed and upon the packing density desired. Apparatus for fixing the spacing between carriage 18 and the array 12 is not shown because it is of a type known in the art and comprises no part of the present invention. Thus, carriage 18** is advantageously about 20 mils above the array when the carriage is moving, and when it has reached the selected location it is lowered to a position less than approximately 5 mils above the array for writing.

Before describing in detail the operation of the motor control circuits 42 and 43, the operation of a sensing head of the type in FIG. 2A should be considered in greater detail. The head **18*a* operates on a differential flux detection basis in that it responds to different flux distribution patterns in the head for different positions with respect to an energized access circuit. The head is moved from a position, not shown, to the left of the conductor 16, toward the right. The conductor 16 is carrying an access current which produces a clockwise magnetic field therearound as indicated by an arrow 73 in FIG. 2A. Thus, as the head 18*a* is moved from the left toward the conductor 16, the magnetic field represented by the arrow 73 is distorted from its circular air path around conductor 16 to close through the magnetic material of the head 18*a*. When head 18*a* is positioned so that conductor 16 is beneath the slot between legs 69 and 70, flux extends upward through the center leg 69 and downward through the right-hand leg 70 of the head 18*a*. As movement of the head continues from the left toward the right, the centered location shown in FIG. 2A is reached, and the field extends upward from the leg 68 and downward through the leg 70 with no significant flux being present in the leg 69 except across the lower face thereof. As the movement of the head 18*a* continues toward the right, the field around the conductor 16 extends upward through leg 68 and downward through leg 69. Thus, as the head 18*a* is moved across the conductor 16 the flux in the center leg 69 builds up in the upper direction as the head approaches the conductor, goes to zero as the head passes through the centered position illustrated, and builds up in the downward direction as the head moves off to the right. If it is assumed that the changing upwardly oriented flux in leg 69 induces a positive signal in coil 71 and that the downward flux induces a negative signal, the total change in the signal induced in coil 71 as the head moves across the conductor 16 with access current therein is illustrated in the voltage-versus-displacement diagram of FIG. 4 by the voltage trace 76**.

Figure 3:
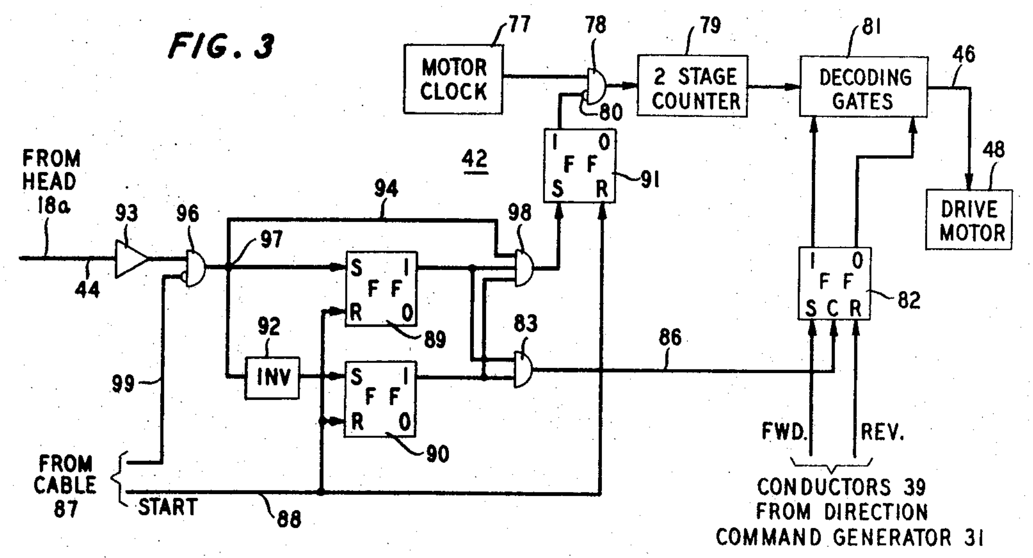
FIG. 3 is a block and line diagram of threshold logic employed for motor control in FIG. 1.

FIG. 3 shows in block and line diagram form the details of the row motor control circuit 42. Since the motor control circuit 43 is similar, its details need not be repeated. A motor clock 77 supplies a train of pulses through a gate 78 to a two-stage counter 79. The gate 78 is of any conventional coincident type but is provided with an inhibiting input connection 80 of a type well known in the art and for a purpose to be subsequently indicated. Thus, gate 78 passes the clock pulses to the counter 79 in the absence of an inhibiting signal at the input connection 80.

Decoding gates 81 are arranged in a well known manner for selecting different sequences of two-phase pulse signals from the outputs of counter 79 for application over the circuit 46 to the drive motor 48. A direction control flip-flop circuit 82 couples direction command signals from conductors 39 to the decoding gates 81 for selecting one or the other of two different sequences of the two phases for thereby controlling the direction of operation of the stepping drive motor 48. Such motors are known to operate in one direction for one phase sequence of applied pulses and to operate in the other direction for a different phase sequence of applied pulses. If the supply of pulses is interrupted, the then prevailing phase of drive pulse continues and the motor 48 is locked in the step position which it had assumed at the time of interruption.

The flip-flop circuit 82 is any suitable bistable circuit which is set in one of its stable states in response to a signal on one of the two input leads 39 and to the other of its stable states on the other of those two input leads. The corresponding signals on the "1" and "0" output connections of the flip-flop circuit 82 control the decoding gates 81. Flip-flop circuit 82 is also provided with a complementing input connection C which receives signals from the coincidence gate 83 by way of a circuit 86 for triggering the flip-flop circuit from either of its two stable states to the other. Thus, the direction of operation of motor 48 is initially fixed by the signal from the command generator 31, but it can be thereafter changed by signals appearing at the complementing input of the flip-flop circuit 82.

Figure 4:
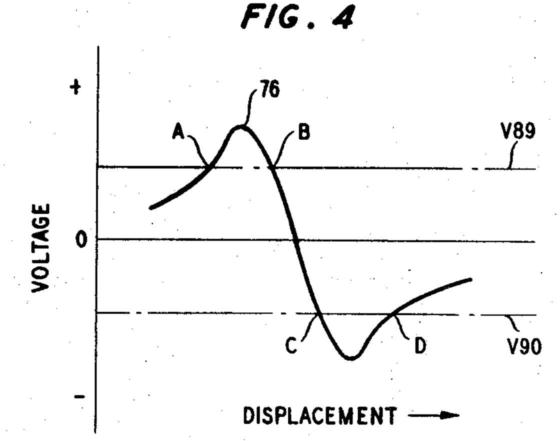
FIG. 4 is a voltage-versus-displacement diagram illustrating the operation of one aspect of the invention.

At the beginning of any writing operation, central control 10 provides a start signal through a cable 87 to a lead 88. The start signal resets three flip-flop circuits 89, 90, and 91 in FIG. 3 to establish the initial condition of the motor control circuit 42. The last mentioned flip-flop circuits are again of any conventional type with the addition of predetermined threshold input connections at the setting inputs of the flip-flops 89 and 90. The input 94 to gate 98 also is subjected to a similar threshold in the gate. Such threshold connections are known in the art and render the circuit nonresponsive to input signal voltage until such voltage exceeds a predetermined threshold level. These voltage threshold levels of the flip-flop circuits 89 and 90 and gate 98 are indicated in FIG. 4 by the horizontal lines designated V89 and V90. The flip-flop circuit and gate thresholds are actually the same, but an inverting circuit 92 is included in series in the setting input to flip-flop 90 so that its threshold voltage V90 is effective as a negative threshold insofar as the outside world is concerned.

As can be seen in FIG. 4, the threshold voltages are related to the voltage swings of signals provided from the corresponding sensing head in the carriage 18 as represented by the trace 76 in FIG. 4. Thus, the trace 76 includes both a positive peak portion and a negative peak portion which extend beyond the thresholds V89 and V90, respectively, on either side of the zero voltage axis of the diagram.

The row stepping motor 48 moves the carriage 18 in the row direction across the various column circuits 16. As the carriage 18 approaches from the left of a column conductor 16 which is carrying access current, a positive voltage appears in the coil 71 of the sensing head 18*a* in the carriage and applies a similar voltage to the circuit 44 in FIG. 3, This voltage is coupled through an amplifier 93 and a gate 96, which is of the same type as the gate 78, to a common circuit junction 97. The latter junction is coupled through the inverter 92 to the setting input of flip-flop 90, and it is also coupled to the setting input of the flip-flop 89 and to a coincidence gate 98. As the voltage increases in a positive direction, the threshold V89 is crossed at the point A in FIG. 4. Upon exceeding that threshold the flop-flop circuit 89 is set, and its binary "1" output provides an enabling signal to the gate 83 and a further enabling signal to the gate 98. Gates 83 and 98 are of any of the well known types which respond to the coincidence of all inputs of a given polarity of signal to produce an output signal of a predetermined polarity.

As the transducing head continues to move toward the right in its approach to the selected column conductor, the positive voltage peaks out and starts to decrease. As it goes through the threshold level V89 at point B there is no change in the state of the flip-flop circuit 89, and the voltage continues in a negative direction through the zero-voltage axis toward the threshold V90. Upon crossing the negative threshold V90 at point C, the voltage in circuit 44 is coupled through inverter 92 in a positive sense to the flip-flop 90 for setting that flip-flop and producing a positive binary "1" output signal to the gates 83 and 98. The latter signal actuates only gate 83, which had been previously enabled by flip-flop circuit 89; and the output thereof complements the direction control flip-flop circuit 82 as previously described. Gate 98 is not actuated because at this time the voltage at the junction 97 is negative, and gate 98 requires a positive pulse for enabling.

The reversal of drive motor 48 causes the motion of the carriage 18 to reverse in like manner, and the carriage moves back toward the center position for sensing head 18*a* over the energized column conductor 16. The voltage trace 76 recrosses the threshold V90 at the point C in a positive-going direction and moves back across the zero-voltage axis toward the threshold voltage V89. Neither of the flip-flop circuits 89 or 90 changes state because both are at this time in their set states. However, when the voltage trace 76 passes through the point B in the positive-going direction, it actuates the gate 98, which had been previously enabled by both flip-flops 89 and 90; and the output of the gate 98 sets the flip-flop circuit 91. Now the binary "1" output of the latter flap-flop actuates the inhibiting input connection 80 to the gate 78 and cuts off the supply of clock pulses to the motor 48. Accordingly, the motor stops, and the movement of the carriage 18 in the row direction is likewise stopped. Thus, the carriage 18 was stopped at the selected column circuit 16 when its column sensing head was moving from the right toward the left.

If the initial condition of memory operation had been such that the carriage 18 was located to the right of the energized column conductor 16, the operation of the control circuit 42 would have been similar to that just described. Thus, the start signal resets the flip-flop circuits 89, 90, and 91, and the direction command from the generator 31 actuates motor 48 to drive the carriage 18 toward the left. Under these conditions the initial voltage produced in the circuit 48 is negative; and as it increases in a negative direction through the threshold level V90 at point D in FIG. 4, the output of inverter 92 sets flip-flop 90 to enable gates 83 and 98. The transducing head continues to move to the left, and the negative signal picked up from the energized column conductor peaks out and decreases toward the zero-voltage axis. As the center position over the conductor is passed, the voltage begins to increase in a positive direction; and, when it crosses the threshold V89 at point B, gate 98 is further enabled and flip-flop 89 is set. The positive "1" output voltage from that flip-flop actuates both of the gates 83 and 98 at the same time. The output of gate 98 sets the flip-flop 91, as before, to cut off the supply of clock pulses to the drive motor 48 and stop the motor. The output of gate 83 complements the flip-flop 82, but this has no effect on the drive motor 48 because the supply of drive pulses has been cut off. It is noted, however, that in this case the carriage 18 was again stopped at the selected location when it approached that location from the right.

Thus, the control circuit 42 operates to move the carriage 18 in the row direction toward a selected memory location and to stop the carriage when the selected location is found, but the stopping occurs only upon approaching the location from the same predetermined direction. The column motor control circuit 43 operates in a similar fashion to control the column direction motor 49 for driving the carriage 18 in the column direction toward the selected row circuit location and for stopping the carriage when it reaches the energized row conductor, but only if it is approaching such conductor from a predetermined direction which is the same for all row addresses along the column direction.

It might appear from the diagram in FIG. 4 that the transducing head finally stops in response to the crossing of a voltage threshold which represents a location slightly off center with respect to an energized conductor. However, it has been found that the slope of the trace 76 is quite steep in the region between the thresholds, and there is consequently no difficutly in fixing those thresholds to stop the carriage 18 with either sensing head within a few tenths of a mil of the exact center location over the corresponding energized conductor. This slight displacement from true center is insignificant in terms of memory elements which have a diameter of about 5 mils. Nevertheless, the displacement of the sense heads from exact center is advantageously compensated by mounting each sensing head a corresponding distance from the writing head in carriage 18 so that the latter head is exactly centered. Similarly, the drive motor 48 is of a type which is easily operable through mechanical linkages to move the carriage 18 in steps of less than a tenth of a mil at a time so that there is no difficulty in regard to significant overshoot of the desired stopping position.

It is further noted that the positioning system just described is an open loop digital system operating on the presence or absence of given supply signals and independent of variations in the amplitudes thereof. Thus, a difference between addresses for a present and a previous writing operation controls the direction of carriage movement, and the address information for the present operation provides signals at the addressed location to stop the carriage. Since the positioning operation is not controlled by a varying error signal, the stability problems of closed loop servo systems are not present.

The memory transducing head carriage positioning system just described has a further advantage over other semipermanent memories which are known in the art in that it can be operating in a writing mode at the same time that the memory is operating in a reading mode. Thus, it is convenient to read out of any first location in the memory at the same time that the carriage 18 is being moved toward a second selected location for writing, and the two locations can be the same or they can be different. In such a dual operating mode, central control 10 provides a signal in a circuit 99 of cable 87 to inhibit the gate 96 of row motor control circuit 42 in FIG. 3, and a similar inhibiting arrangement is provided for the column motor control circuit 43. This deprives the motor control circuits of their respective sensing heat output signals during the comparatively brief interval when a reading operation is being carried out. The inhibiting of the motor control circuits is carried out in conjunction with column circuit readout strobing by signals in cable 23 that make bit selection and detection circuits 26 responsive only during read operations. Consequently, essentially simultaneous read and write operations are carried out without interfering with one another. For example, a complete nondestructive readout operation can be readily accomplished in approximately 150 nanoseconds, as is well known in the art for bicore memory elements of the type described. However, such a brief interval is insignificant in terms of the movement of the transducing head 18 and the operation of its respective drive motors 48 and 49 since it is only a small fraction of a drive pulse interval on either of the circuits 46 and 47.

A similar inhibiting signal would also be provided by the central control 10 through the cable 19 to the address decoding circuits 20 for inhibiting the application of the read address signals to the cables 29 and 30 so that the operation of the direction command generator 31 is not changed by the reading address information. Consequently, the drive motors continue to operate and the carriage 18 continues to move toward its previously selected writing location while one or more reading operations are being conducted. At suitably programmed intervals the inhibiting signal on circuit 99 to each motor control circuit is removed to enable the motor control circuits 42 and 43 to sample the condition of their sensing head output circuits 44 and 45. Thus, in the time required for the carriage 18 to be moved between the points B and C, for example, in FIG. 4, a large number of reading operations could easily be carried out.

In the present state of the art it is normally necessary to modify the information in semipermanent memories by shutting down the entire data processing system, or at least by shutting down the store at a time of low traffic incidence, to permit the comparatively long-time information modifying operation to take place. However, in the system just described, the writing operations can be carried out at any time because reading access to the memory is available even while the carriage transporting part of a writing operation is in progress.

Although the invention has been described in connection with a particular embodiment thereof, it is to be understood that additional embodiments and modifications which will be obvious to those skilled in the art are included within the spirit and scope of the invention.

What is claimed is:

1. In combination, a plurality of memory storage locations, a writing carriage operable for controlling the nature of information stored in selected ones of said locations, means supplying address signals designating at least one of said selected locations, means moving said carriage toward said one location as a first function of said signals, and means stopping said carriage at said one location in response to a second and different function of said signals.

2. The combination in accordance with claim 1 in which said carriage includes means for simultaneously writing information into a plurality of said storage locations, and means comprising a part of said stopping means and detecting changes in magnetic flux adjacent to said head with changes in head position.

3. The combination in accordance with claim 1 in which said supplying means includes access circuits defining said locations, means applying current to said access circuits for reading out the information content of storage locations other than said selected locations while said carriage is moving toward said one selected location, and means temporarily disabling said stopping means during the last-mentioned reading operations.

4. The combination in accordance with claim 1 in which said supplying means includes means providing a pulse train to said one storage location for designating that location, and said stopping means includes on said carriage detecting means having a high-frequency pass characteristic that is relatively insensitive to information stored in said storage locations but is responsive to said pulse train for stopping said carriage.

5. The combination in accordance with claim 1 in which said first function is the polarity of the difference between a newly selected address location and the previous address location of said head, said moving means is actuated in a direction corresponding to said polarity, and said stopping means includes means independent of said moving means, and responsive to address signals defining said new location, supplying, as said second function, a further signal at said newly selected address, and means halting said carriage in response to said further signal.

6. The combination in accordance with claim 5 in which said locations are arranged in rows and columns of a rectangular coordinate system, and said moving means comprises first means operative to move said head along rows of said system and second means operative to move said head along columns of said system.

7. The combination in accordance with claim 1 in which said moving means comprises means storing address signals from a first memory writing operation, means, independent of said stopping means, comparing address signals for said first writing operation with address signals for a subsequent writing operation for producing a command signal which is indicative of the direction of said subsequent address from said first address, and means transporting said carriage toward said subsequent address in response to said command signal, and said stopping means comprises means coupling current, as said second function, to locations designated by said address signals.

8. The combination in accordance with claim 7 in which said transporting means comprises a source of pulses, a stepping motor, means responsive to said pulses for driving said motor in a direction indicated by said command signal from said comparing means, and means coupling said motor for transporting said carriage.

9. The combination in accordance with claim 1 in which said stopping means comprises a plurality of access circuits fixedly associated with said storage locations, means applying current to selected ones of said access circuits for designating said one location, and means responsive to said current halting said carriage at said one selected location.

10. The combination in accordance with claim 9 in which said halting means comprises a magnetic flux detecting means connected to said carriage for detecting a predetermined characteristic of a magnetic field associated with said current.

11. The combination in accordance with claim 10 in which said detecting means produces an output which is a function of the position of said carriage with respect to the magnetic field around one of said selected access circuits, and said halting means comprises threshold means responsive to the output of said detecting means and disabling said moving means.

12. The combination in accordance with claim 11 in which said threshold means comprises means establishing electric signal thresholds of opposite polarities with respect to a null signal point corresponding to the location of said detecting means directly over one of said selected access circuits, and said halting means comprises means stopping said head only in response to a variation of said detecting means output signal through both of said thresholds in a predetermined sequence.

13. The combination in accordance with claim 12 in which said halting means comprises means detecting the variation of said signal through both of said thresholds in any sequence and reversing the direction of operation of said moving means in response thereto, and means detecting the variation of said signal through a first predetermined one of said two thresholds after its variation through a second one of said thresholds and actuating said halting means in response thereto.

References Cited

UNITED STATES PATENTS

| | | | |
|---|---|---|---|
| 3,449,735 | 6/1969 | Cogar | 340—174.1 |
| 2,915,597 | 12/1959 | Wanlass et al. | 779—100.2 |

OTHER REFERENCES

Hagopian, J. J., "Automatic Magnetic Track Seeking System," IBM Tech. Disc. Bul., vol 9, No. 11, April 1967, pp. 1499–1500.

STANLEY M. URYNOWICZ, Jr., Primary Examiner

W. F. WHITE, Assistant Examiner